US011906790B2

(12) United States Patent
Tseng

(10) Patent No.: US 11,906,790 B2
(45) Date of Patent: Feb. 20, 2024

(54) OPTICAL CONNECTOR AND OPTICAL CONNECTOR MODULE THEREOF

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 83 days.

(21) Appl. No.: 17/151,169

(22) Filed: Jan. 17, 2021

(65) Prior Publication Data

US 2021/0373248 A1 Dec. 2, 2021

Related U.S. Application Data

(60) Provisional application No. 63/032,630, filed on May 31, 2020.

(51) Int. Cl.
*G02B 6/38* (2006.01)

(52) U.S. Cl.
CPC .......... *G02B 6/387* (2013.01); *G02B 6/3839* (2013.01); *G02B 6/3882* (2013.01)

(58) Field of Classification Search
CPC ....... G02B 6/3882; G02B 6/38; G02B 6/3885
See application file for complete search history.

(56) References Cited

U.S. PATENT DOCUMENTS

| | | | | |
|---|---|---|---|---|
| 5,210,810 | A * | 5/1993 | Darden | G02B 6/383 385/78 |
| 10,852,487 | B1 * | 12/2020 | Ignatius | G02B 6/3879 |
| 2013/0266271 | A1 * | 10/2013 | Li | G02B 6/3882 385/83 |
| 2017/0176694 | A1 * | 6/2017 | Childers | G02B 6/3821 |
| 2017/0315308 | A1 * | 11/2017 | Kamada | G02B 6/3898 |
| 2017/0322379 | A1 * | 11/2017 | de Jong | G02B 6/3869 |

* cited by examiner

*Primary Examiner* — Eric Wong

(57) ABSTRACT

The present invention provides a latch structure arranged in an optical receptacle. The latch structure comprises a supporting element and a first clip structure, wherein the supporting element is assembled with the housing of the optical receptacle. The first clip structure is formed on the supporting element for retaining the optical connector inserting into the optical receptacle. The main idea of the present invention is that when the latch structure assembling with the optical receptacle, there is no interaction force between the first clip structure and optical receptacle so as to maintain the clipping force of the first clip structure acting on the optical connector.

17 Claims, 13 Drawing Sheets

30 301a 301c 301b 301g 301d 301i 301h 301e 301g 301 30a 301f 301h 300l 300 300j 301b 300c 300d 300k 300i 300f 300g 300e 300a 300h 303 302 300d 300b 90 300c 303a 9 302a 302 304 304a 304b 304d 304c

OPTICAL CONNECTOR AND OPTICAL CONNECTOR MODULE THEREOF

CROSS-REFERENCE TO RELATED APPLICATION

This application claims the benefit under 35 U.S.C. § 119(e) to the U.S. provisional patent application having the Ser. No. 63/032,630 filed on May 31, 2020, the entirety of which is incorporated herein by reference.

FIELD OF INVENTION

The present invention relates to an optical connector. In particular, it relates to an optical connector and an optical connector thereof having a detachable protection structure.

BACKGROUND OF THE INVENTION

With the increase in communication demand and technological advancement, data centers need better signal transmission media to meet the increasing demand for data volume and transmission speed. Among various signal transmission media, due to the advantages of high frequency bandwidth and low loss, optical fibers have been widely used as signal transmission media in recent years. The use of optical fiber has already had a major revolutionary impact in the communications industry. Nowadays, 100 G optical module communication is not enough, and the future will be expected to move towards the era of 400 G optical module communications.

In the application field of optical fiber communication, the optical connectors are very important components. In conventional technology, the optical fiber head end used for signal transmission needs to be protected to prevent users from accidentally touching or being polluted during use. As shown in FIG. 1, which is a schematic diagram of a conventional optical connector. The end of the optical fiber head 100 of the conventional optical connector 10 has an anti-collision structure 101. Although this component may protect the optical fiber head 100, it may be very difficult if it needs to be cleaned or checked for contamination.

In summary, it is necessary for an optical connector and an optical connector module thereof to solve the shortcomings of conventional technologies.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector with a protection fork, which is used to protect the optical fiber head of the optical connector from being polluted and prevent accidental insertion. In addition, the protection fork of the present invention can be disassembled to facilitate users to repair and maintain the optical fiber head.

The present invention provides an optical connector. With the detachable design of the protection fork structure, the main structure of the optical connector having the optical fiber head may move along the axial direction of the optical connector, so that the main structure of the entire optical connector can be installed eventually, and does not need to be inserted in advance. In addition, since the main structure of the optical fiber head can be moved, during maintenance, the optical fiber head can be pulled out for maintenance and cleaning. After maintenance, the optical fiber head can be pulled back into the protection fork, which increases the convenience of maintenance.

In one embodiment of the present invention, the present invention provides an optical connector, comprising: a first coupling module; a first protection housing, having a first opening, the first protection housing having a first cover on a side of the first opening, and a first plate protruding from an end of the first cover; and a second cover, detachably coupled to the first protection housing, an accommodation space formed between the first cover and the second cover for accommodating the first coupling module, and a second plate protruding from an end of the second cover.

In another embodiment of the present invention, the present invention also provides an optical connector module, comprising: a first optical connector, including a first coupling module, a first protection housing, and a second cover, the first protection housing having a first opening, and the first protection housing having a first cover on a side of the first opening, a first plate protruding from an end of the first cover, the second cover detachably connected to the first protection housing, a first accommodation space is formed between the second cover and the first cover for accommodating the first coupling module, and a second plate protruding from an end of the second cover; and a second optical connector, coupled to the first optical connector, the second optical connector having a second coupling module, a second protection housing, and a fourth cover, the two protection housing having a second opening, the second protection housing having a third cover on a side of the second opening, and a third plate protruding from an end of the third cover, the fourth cover detachably coupled to the second protection housing, a second accommodation space formed between the fourth cover and the third cover for accommodating the second coupling module, and a fourth plate protruding from an end of the fourth cover, wherein when the second optical connector is coupled to the first optical connector, the first coupling module is coupled to the second coupling module, the second plate is combined with the fourth cover, the fourth plate is combined with the second cover, the first plate is leaned against a side of the fourth plate, and the third plate is leaned against a side of the second plate.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1:
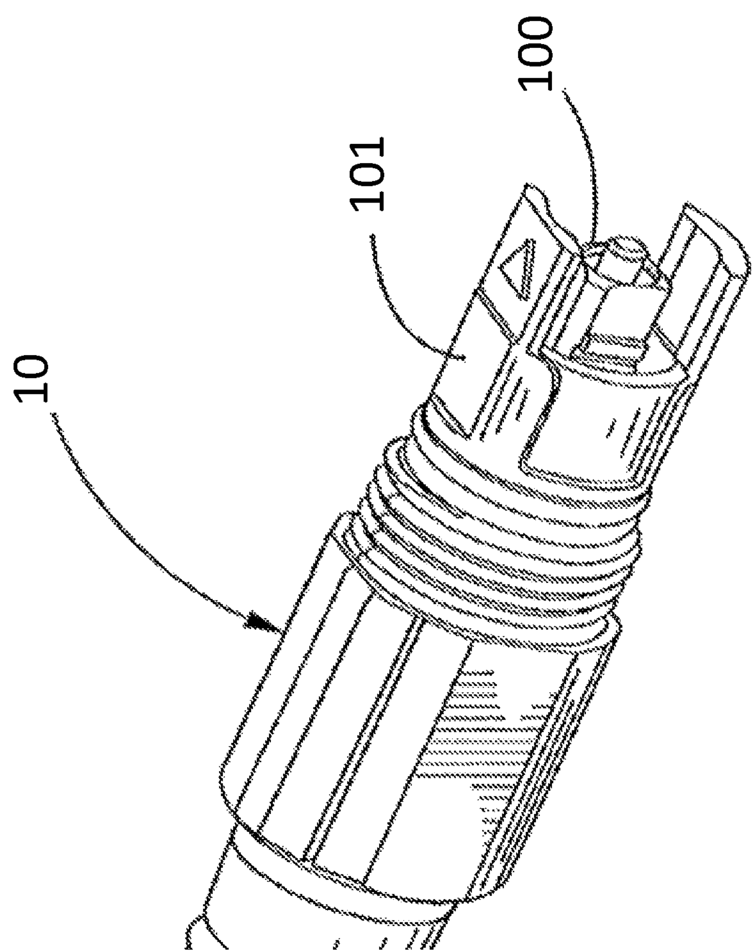
FIG. 1 is a schematic diagram of a conventional optical connector.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical connector and an optical connector module thereof and to aid it of skilled in the art in practicing this invention. These embodiments are merely exemplary embodiments and in no way to be considered to limit the scope of the invention in any manner.

Figure 2A:
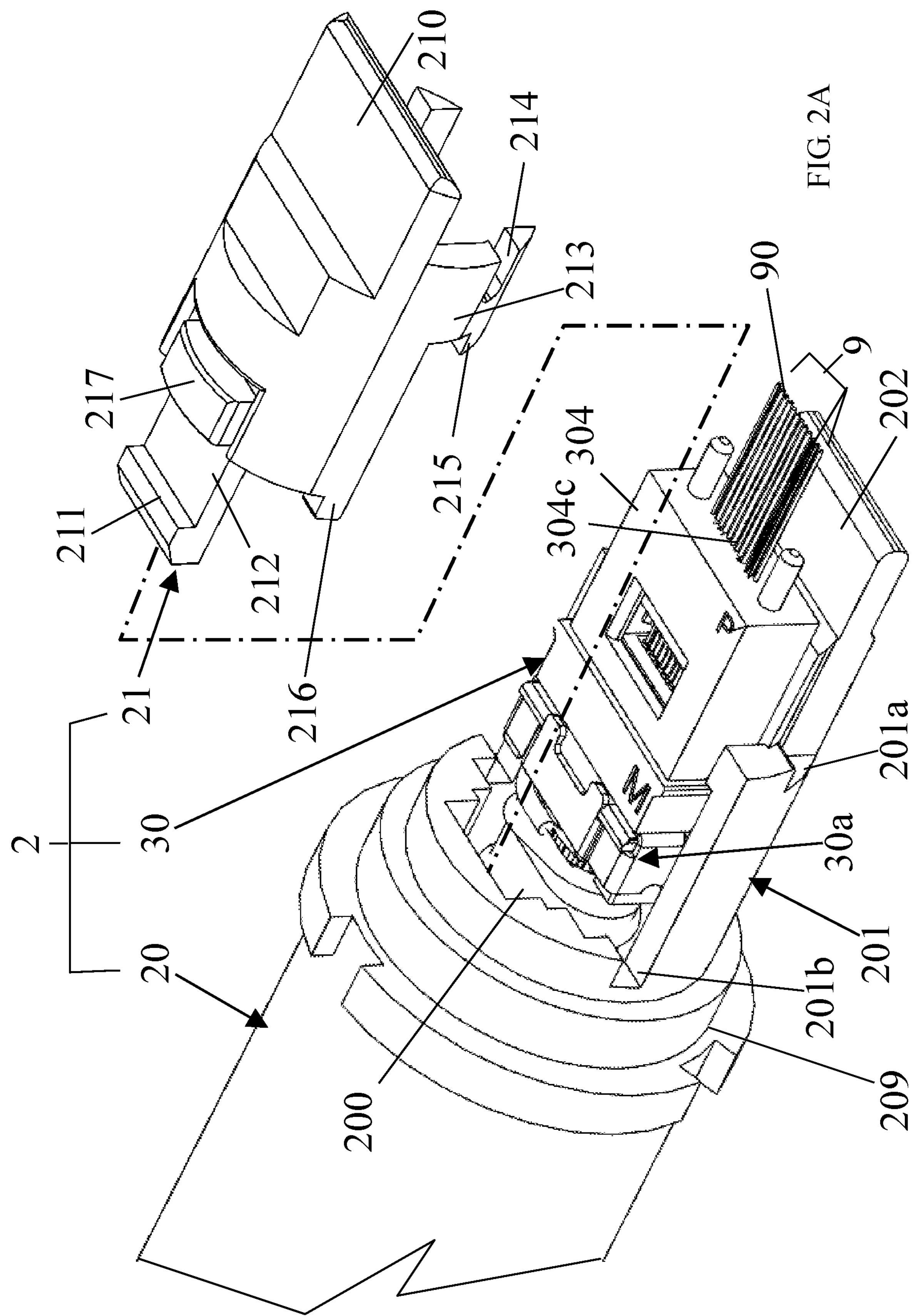
FIGS. 2A and 2B are respectively a three-dimensional schematic diagram and a cross-sectional schematic diagram of the optical connector in the present invention.
Figure 2B:
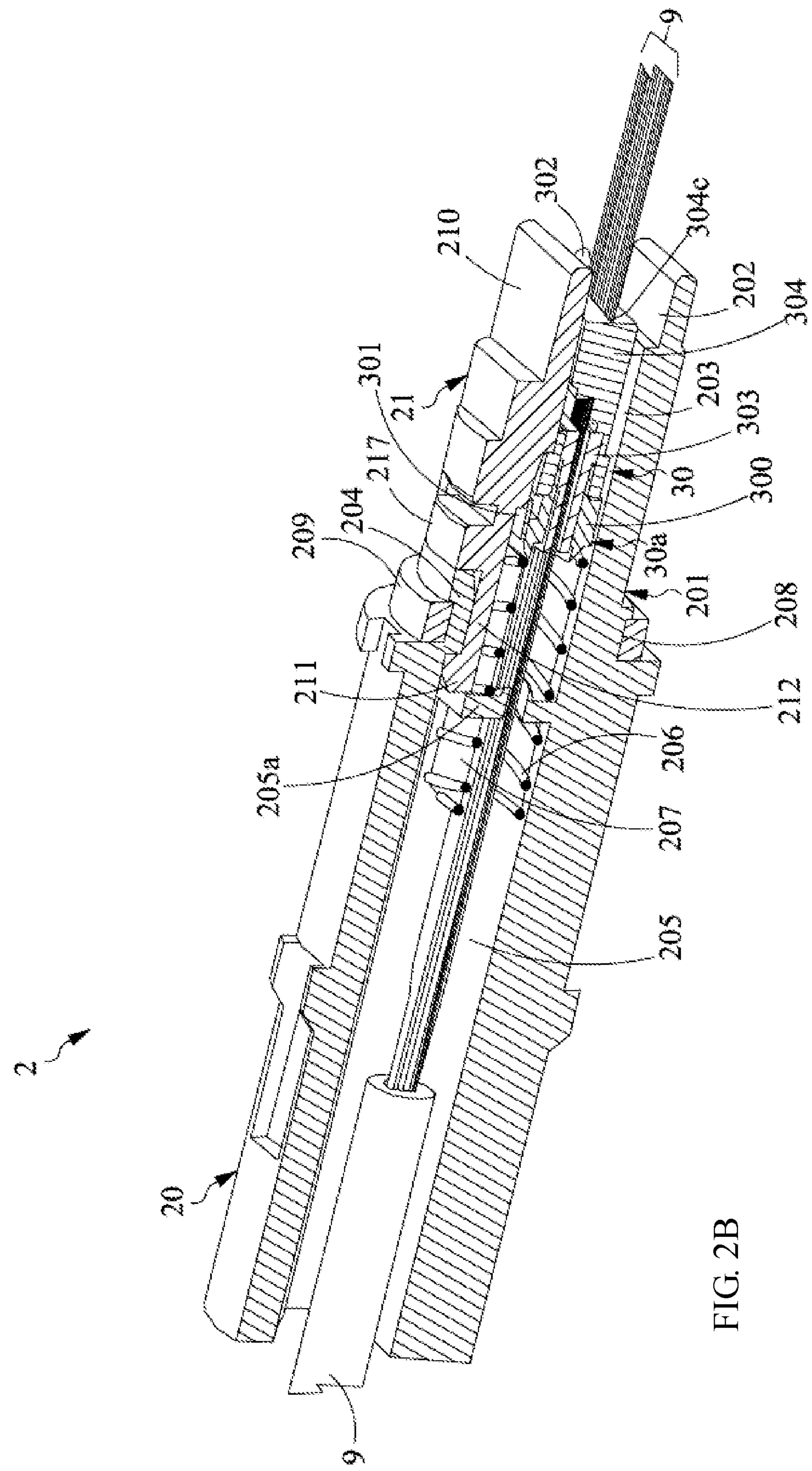

Please refer to FIGS. 2A and 2B, which are respectively a three-dimensional schematic diagram and a cross-sectional schematic diagram of the optical connector in the present invention. The optical connector 2 has a first coupling module 30, a first protection housing 20 and a second cover 21. The first coupling module 30 is an optical fiber head of the optical connector 2 and is used as a main structure for coupling and telecommunication transmission, and has a communication wire 9 with a plurality of sub wires 90. In this embodiment, the plurality of sub wires 90 is an optical fiber, but it is not limited herein.

Figure 3A:
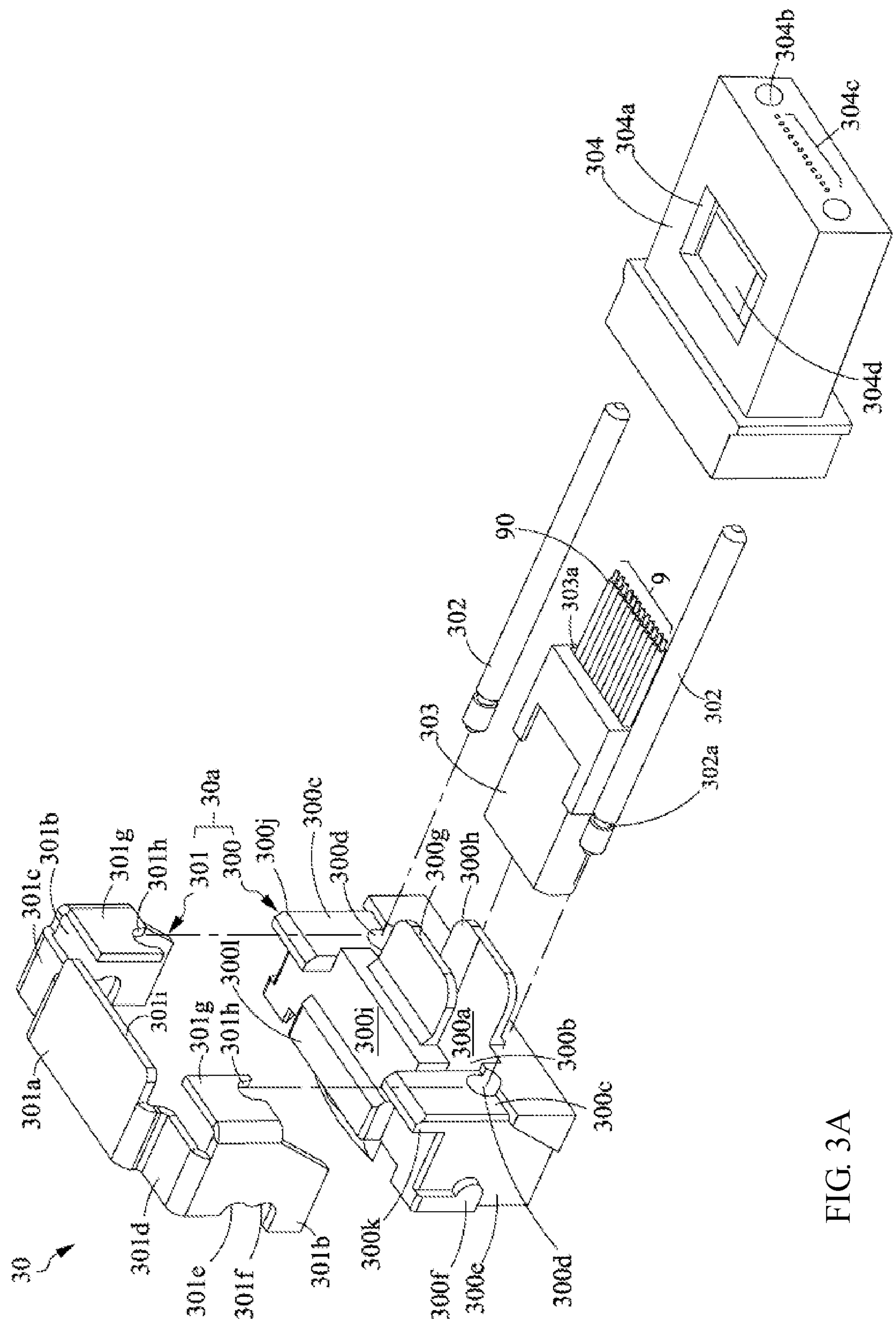
FIG. 3A is a three-dimensional schematic diagram of an embodiment of the first coupling module in the present invention.

In one embodiment, the structure of the first coupling module 30, as shown in FIG. 3A, which is a three-dimensional schematic diagram of an embodiment of the first coupling module in the present invention. The first coupling module 30 includes a guide pin fixing structure 30*a*, which has a fixing base 300 and a positioning member 301. The fixing base 300 has a through groove 300*a*, and the surfaces 300*c* on both sides of the first slot 300*b* of the through groove 300*a* respectively have through holes 300*d* for accommodating the guide pins 302. A first buckle structure 300*f* is formed on two lateral surfaces 300*e* of the fixing base 300, respectively. In this embodiment, the first buckle structure 300*f* is a convex structure. A pair of clamping plates 300*g* and 300*h* protrude from the end surface of the first slot 300*b*. On the top surface 300*i*, there are convex walls 300*j* and 300*k* and a convex body 3001, wherein the convex walls 300*j* and 300*k* respectively correspond to through holes 300*d*, and the two convex walls 300*j* and 300*k* are separated by a predetermined distance.

The positioning member 301 is disposed on the fixing base 300, and the positioning member 301 has a connecting plate 301*a* and a pair of mutually parallel lateral plates 301*b*. In this embodiment, the connecting plate 301*a* and the pair of lateral plates 301*b* form an inverted U-shaped structure and are slidably arranged on the fixing base 300. The two sides of the connecting plate 301*a* are bent into sub-connecting plates 301*c* and 301*d*, which are respectively connected to the pair of lateral plates 301*b*. A second buckle structure 301*e* and a third buckle structure 301*f* are disposed on each lateral plate 301*b*. In this embodiment, the second buckle structure 301*e* and the third buckle structure 301*d* are concave structures that may be engaged with the first buckle structure 300*f*. Each lateral plate 301*b* is further bent into a positioning plate 301*g*, and a leaning structure 301*h* is formed on the positioning plate 301*g*.

When the positioning member 301 is combined with the fixing base 300, the pair of lateral plates 301*b* are slidably connected to the lateral surfaces 300*e* on both sides of the fixing base 300, respectively. When the positioning member 301 is located at the first position, the second buckle structure 301*e* is engaged with the first buckle structure 300*f*. In this state, the leaning structure 301*h* is leaned against the surface of the corresponding guide pin 302, resulting in the effect of fixing the guide pin 302. In this embodiment, the position of the guide pin 302 corresponding to the leaning structure 301*h* has an annular groove 302*a*. Therefore, when the positioning member 301 is located at the first position, the leaning structure 301*h* is embedded into the annular groove 302*a* to generate fixing and leaning effect. As a result, through the mutual restraint of the leaning structure 301*h* and the annular groove 302*a*, the guide pin 302 is positioned in the through hole 300*d* of the fixing base 300.

In addition, when the positioning member 301 is located at the first position, the sub-connecting plates 301*c* and 301*d* are leaned against the top surface 300*i*. The sub-connecting plates 301*c* and 301*d* are formed by bending the two sides of the connecting plate 301*a*, when the positioning member 301 is located at the first position, there is a height difference between the connecting plate 301*a* and the top surface 300*i*.

The extending plate 301*i* extends from the connecting plate 301*a*. When the positioning member 301 is located at the first position, the extending plate 301*i* is located between the two convex walls 300*j* and 300*k*. Also, when the positioning member 301 is located at the first position, the sub-connecting plate 301*c* is located on the top surface 300*i* between the convex wall 300*j* and the convex body 3001, and the sub-connecting plate 300*d* is located on the top surface 300*i* between the convex wall 300*k* and the convex body 3001. The first coupling module 30 further has a clamping seat 303, which is disposed between the pair of clamping plates 300*g* and 300*h*. The clamping seat 303 has a wire groove 303*a* to allow communication wires 9 with a plurality of sub-wires 90 to pass through. In this embodiment, the communication wire 9 is a light guiding material, such as an optical fiber. One end of the clamping seat 303 penetrates into the through groove 300*a* via the first slot 300*b*.

Figure 3B:
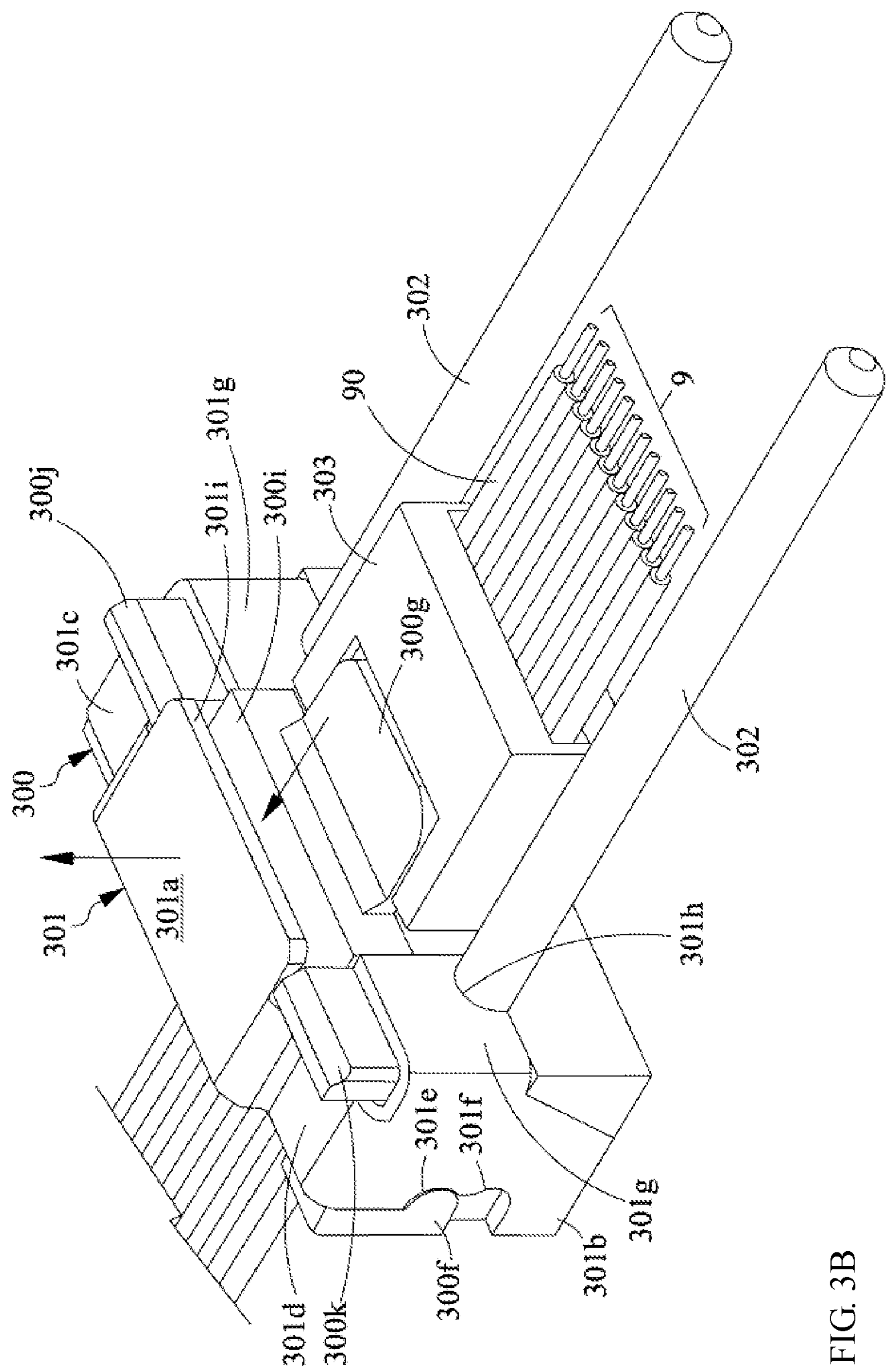
FIGS. 3B and 3C are schematic diagrams of moving the positioning member of the first coupling module from a first position to a second position in the present invention.
Figure 3C:
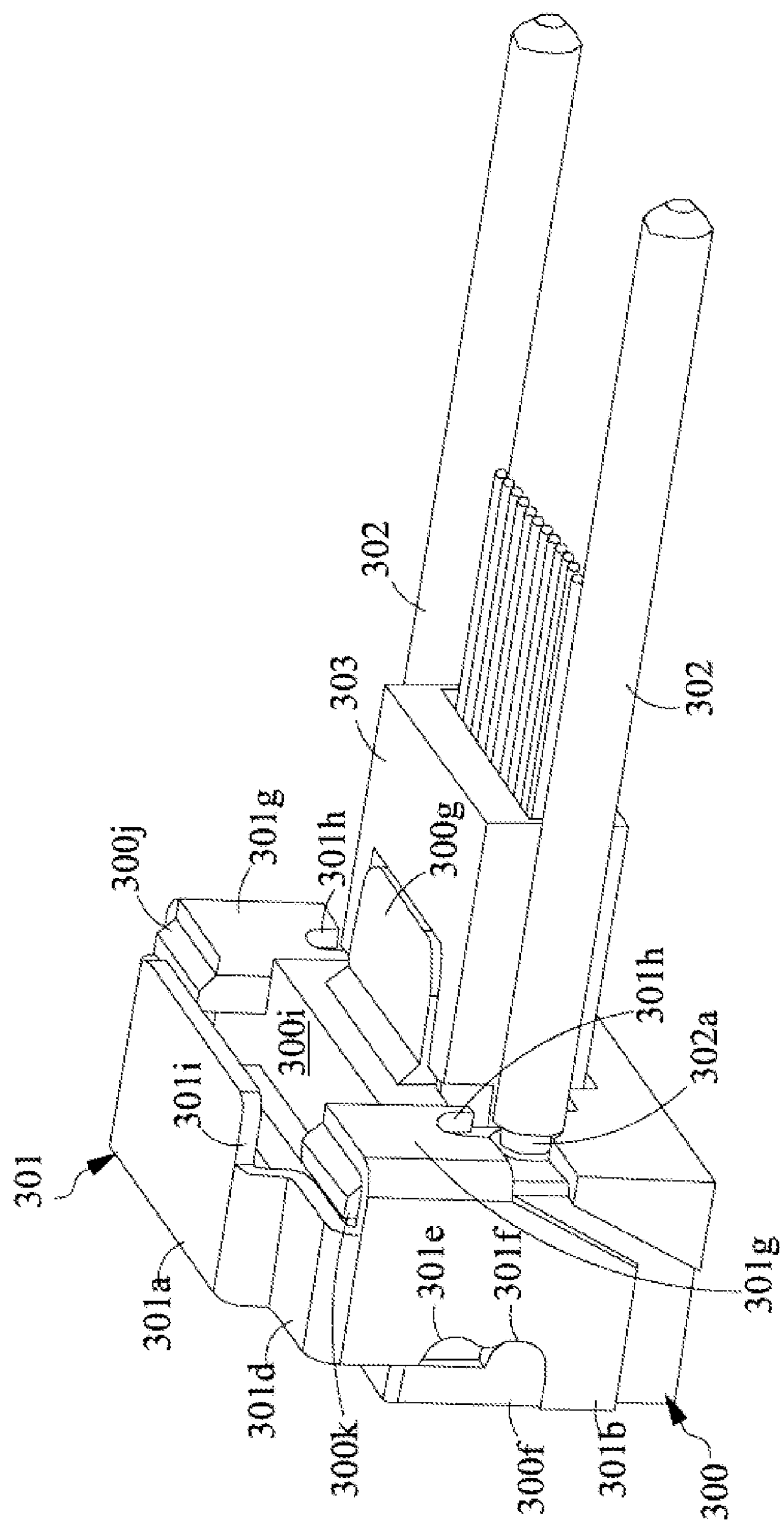

Please refer to FIGS. 3A to 3C, wherein FIGS. 3B and 3C are schematic diagrams of moving the positioning member of the first coupling module from a first position to a second position in the present invention. As shown in FIG. 3B, when the positioning member 301 is located at the first position, the leaning structure 301*h* is embedded and leaned against the annular groove 302*a* of the guide pin 302, so that the guide pin 302 is positioned in the through hole 300*d* of the fixing base 300. Also, because the second buckle structure 301*e* is engaged with the first buckle structure 300*f*, the positioning member 301 may be firmly fixed on the fixing base 300. When the user wants to replace the guide pin 302 or pull out the guide pin 302 for other purposes, the extending plate 301*i* may be lifted through applying a force to a space between the extending plate 301*i* and the top surface 300*i* by a jig or finger, the force of which may release the second buckle structure 301*e* from the restraint of the first buckle structure 300*f*, so that the positioning member 301 moves upward.

In this embodiment, because the positioning member 301 further has a third buckle structure 301*f* located on one side of the second buckle structure 301*e*. After the second buckle structure 301*e* is pushed away from the first buckle structure 300*f*, the third buckle structure 301*f* would be engaged with the first buckle structure 300*f* to position the positioning member 301 at the second position. Since the positioning member 301 has moved upward for a predetermined distance, the leaning structure 301*h* also moves upward for a predetermined distance, so that the leaning structure 301*h* no longer contacts the annular groove 302*a* on the surface of the guide pin 302. In this state, the user is able to take out the guide pin for replacement or maintenance. It should be noted that the third buckle structure 301*f* is not a necessary structure. The third buckle structure 301*f* may increase the fixing effect at the second position. Therefore, even without this structure, it does not affect the insertion and removal of the guide pin 302.

Please refer to FIG. 3A, in this embodiment, the first coupling module 30 further has a coupling head 304 that is coupled to the clamping seat 303. Wherein, the coupling head 304 has a wiring space 304*d* through which the communication wire passes, an observation window 304*a* connected to the wiring space 304*d*, a through hole 304*b*, and a plurality of wire channels 304*c* connected to the wiring space 304*d*. The guide pin 302 penetrates into the coupling head 304 and then passes through the through hole 304*b*. In this embodiment, the side of the through hole 304*b* corresponding to the clamping seat 303 has an insertion hole, which allows the clamping seat 303 to insert in, so that the coupling head 304 and the clamping seat 303 are combined. In this embodiment, the communication wire 9 enters the coupling head 304, and then passes through the observation window 304*a* to the exit of the wire channels 304*c*. The user may clearly observe the insertion process of each sub-wire 90 in the observation window 304*a*. In case there is a problem, because the observation window 304*a* is open, the sub-wire may also be toggled to make the sub-wire enter the wire channels 304*c* and pass through the coupling head 304.

Please refer to FIGS. 2A and 2B, the first protection housing 20 has a first opening 200, and the first protection housing 20 has a first cover 201 on one side of the first opening 200. The first plate 202 protrudes from one end of the first cover 201. The second cover 21 is detachably connected to the first protection housing 20, and an accommodation space 203 is formed between the second cover 21 and the first cover 201 for accommodating the first coupling module 30 of the optical connector 2. The second plate 210 protrudes from one end of the second cover 21 and is parallel to the first plate 202. The end surfaces of the first plate 202 and the second plate 210 exceed the end surface of the first coupling module 30, so that the first plate 202 and the second plate 210 form a protection fork structure for protecting the first coupling module 30. It avoids directly exposure of the first coupling module 30, which may not cause pollution or damage to the first coupling module 30 and the optical fiber.

In this embodiment, the first protection housing 20 has a fourth buckle structure 204, and the second cover 21 has a fifth buckle structure 211 formed on the first pressing plate 212 of the second cover 21. The second cover 21 has a first coupling portion 216 located on both sides of the first pressing plate 212, and the first protection housing 20 located on both sides of the first opening 200 has a second coupling portion 201*b* at a position corresponding to the first coupling portion 216. There is a clamping plate 213 on both sides of the second cover 21, and a first positioning structure 214 and a third positioning structure 215 are disposed on the clamping plate 213. In addition, the first cover 201 has a fourth positioning structure 201*a* at the end of the first plate 202. When the second cover 21 is combined with the first protection housing 20, the fifth buckle structure 211 is engaged with the fourth buckle structure 204, and the first coupling portion 216 is a convex portion in this embodiment. The first coupling portion 216 is embedded in the second coupling portion 201*b*. The third positioning structure 215, which is a convex portion in this embodiment, is also embedded in the fourth positioning structure 201*a*, so that the second cover 21 may be firmly combined with the first protection housing 20.

Figure 4A:
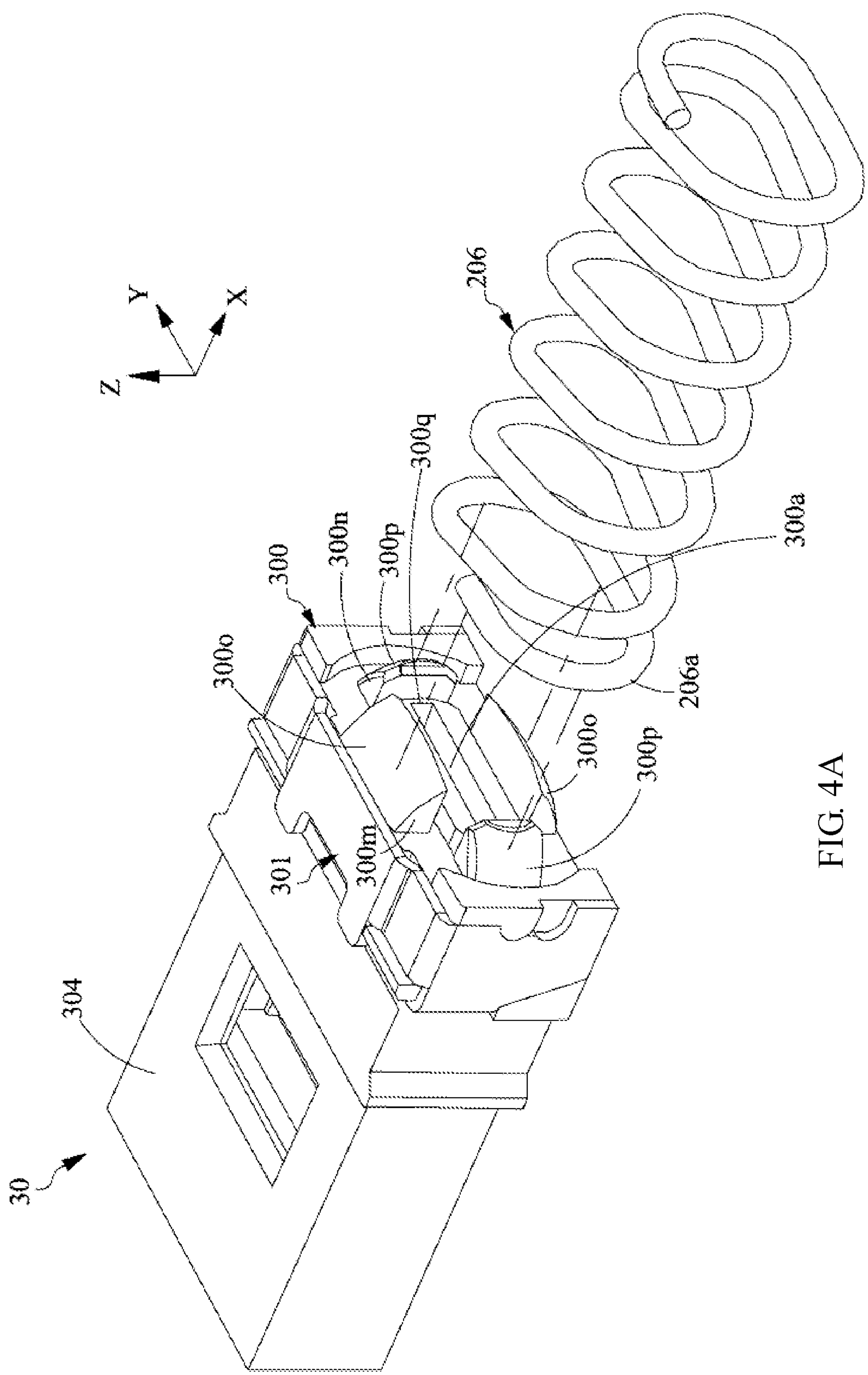
FIG. 4A is a schematic diagram of an embodiment of connecting the elastic element and the first optical module in the present invention.
Figure 4B:
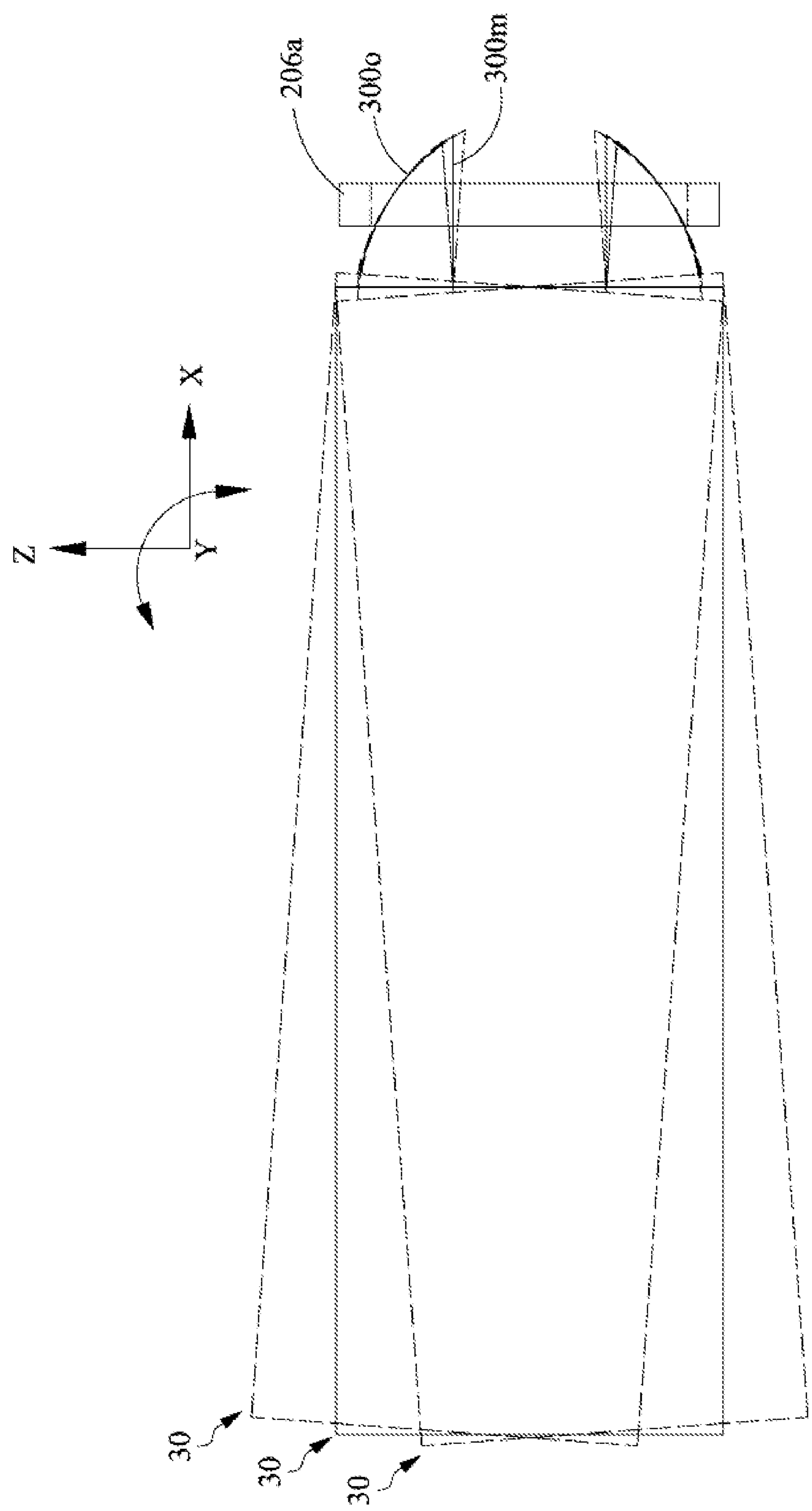
FIG. 4B is a schematic diagram of angle adjustment of the guiding block in the Z axis in the present invention.

In this embodiment, the first protection housing 20 is a tubular housing structure, with a first cover 201 integrally formed at the front end, and an accommodation space 205 is disposed inside the first protection housing 20 to allow the communication wire 9 to pass through. The multiple sub-wires 90 in the communication wire 9 pass through the guide pin fixing structure 30*a*, and then protrude from the wire channels 304*c* on the end surface of the coupling head 304. There is an elastic element 206 and an envelope 207 in the accommodation space 205. The envelope 207 is used to cover the periphery of the plurality of sub-wires 90, and the elastic element 206, which is a spring in this embodiment, is sleeved on the envelope 207, one end of the elastic element 206 is leaned against the end surface of the fixing base 300. In this embodiment, as shown in FIG. 4A, there are a plurality of guide blocks 300*m* and 300*n* on the surface that the fixing base 300 and the elastic element 206 are leaned against each other. The second slot 300*q* located at another end of the through groove 300*a* of the fixing base 300 has a plurality of guide blocks 300*m* arranged in the Z axis, and The second slot 300_q_ located at another end of the through groove 300_a_ of the fixing base 300 has a plurality of guide blocks 300_n_ arranged in the Y axis. The positions where the guide blocks 300_m_ and 300_n_ are in contact with the end of the elastic element 206 have curved surfaces 300_o_ and 300_p_. Through the design of the curved surfaces 300_o_ and 300_p_, the entire first coupling module 30 may have the effect of fine-tuning angle. Taking FIG. 4B as an example, it shows a schematic diagram of angle adjustment of the guiding block in the Z axis in the present invention. Since the end portion 206_a_ of the elastic element 206 is in contact with the curved surface 300_o_, the curved surface 300_o_ may provide the freedom of the entire first coupling module 30 with fine-tuning the rotation angle in the Y axis. Similarly, the curved surface 300_p_ of the guide block 300_n_ in FIG. 4A may fine-tune or adjust the rotation angle of the first coupling module 30 in the Z axis.

Please refer to FIGS. 2A and 2B, the other end or a predetermined position in the middle of the elastic element 206 is leaned against the leaning plate 205_a_ in the accommodation space 205, so that the elastic element 206 may generate an elastic force on the first coupling module 30. An annular groove 208 is further formed on the periphery of the fourth buckle structure 204 of the first protection housing 20. An airtight element 209, such as an O-ring, is sleeved on the annular groove 208. The second cover 21 further comprises a pressing body 217. After the second cover 21 is combined with the first protection housing 20, if it is necessary to disassemble the second cover 21, the user is able to apply a force to the pressing body 217, the force would be delivered to the first pressing plate 212, causing the first pressing plate 212 to move downwards, so that the fifth buckle structure 211 is separated from the fourth buckle structure 204, and the second cover 21 is disassembled from the first protection housing 20.

Figure 5A:
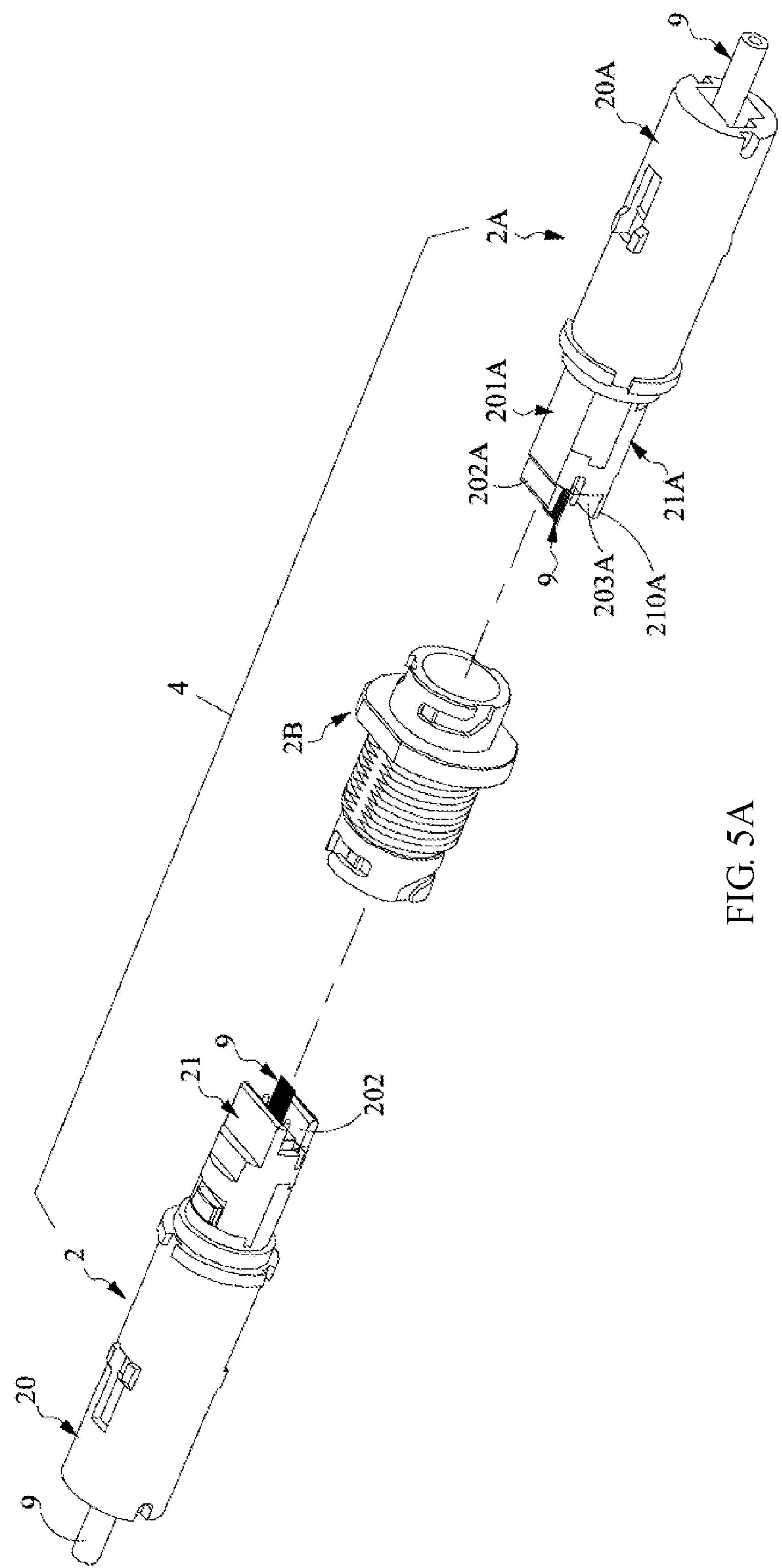
FIGS. 5A and 5B are partial exploded and three-dimensional schematic diagram of an embodiment of the optical connector module in the present invention.
Figure 5B:
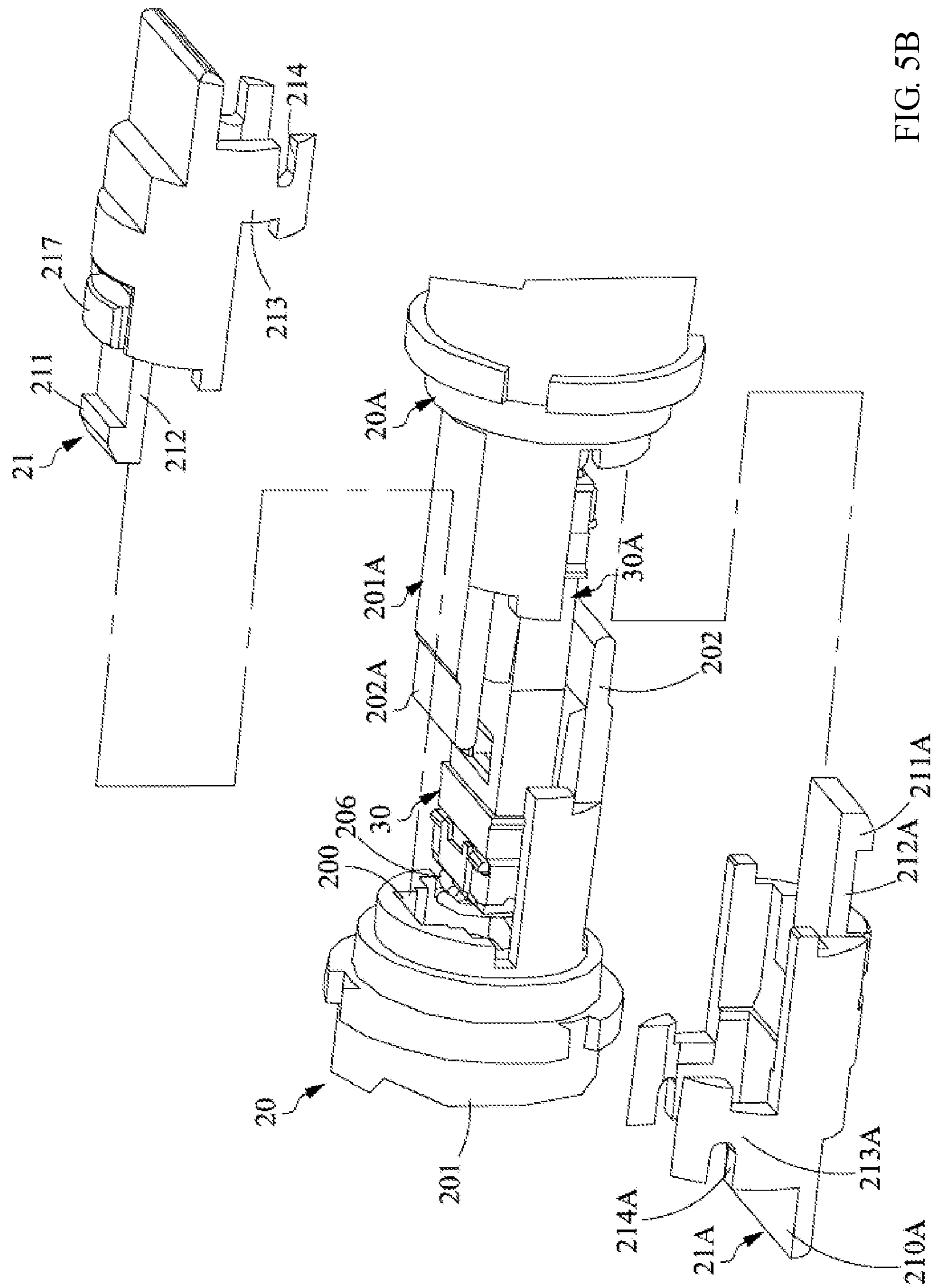
Figure 5C:
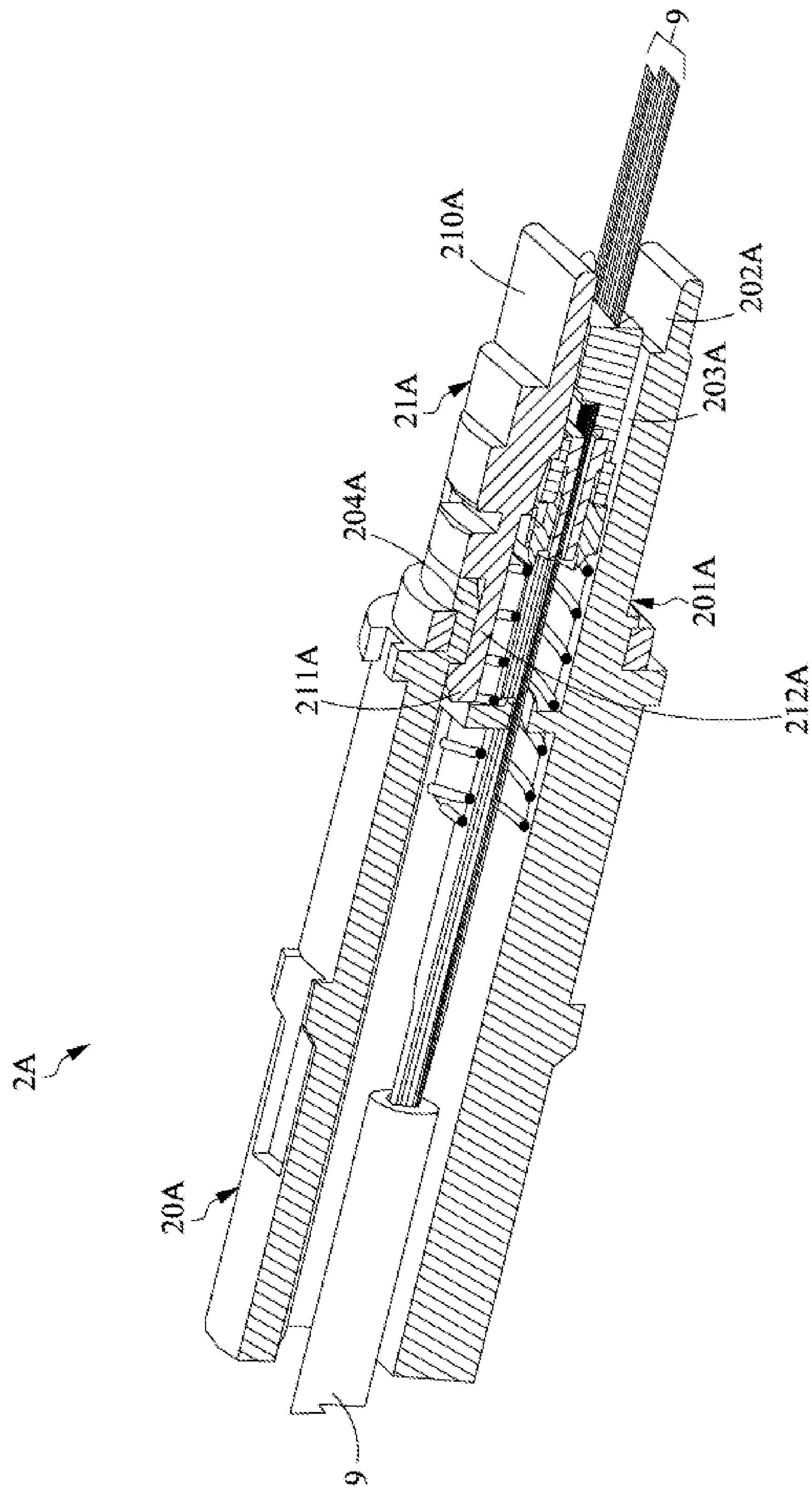
FIG. 5C is a schematic cross-sectional diagram of an embodiment of the second optical connector in the present invention.
Figure 5D:
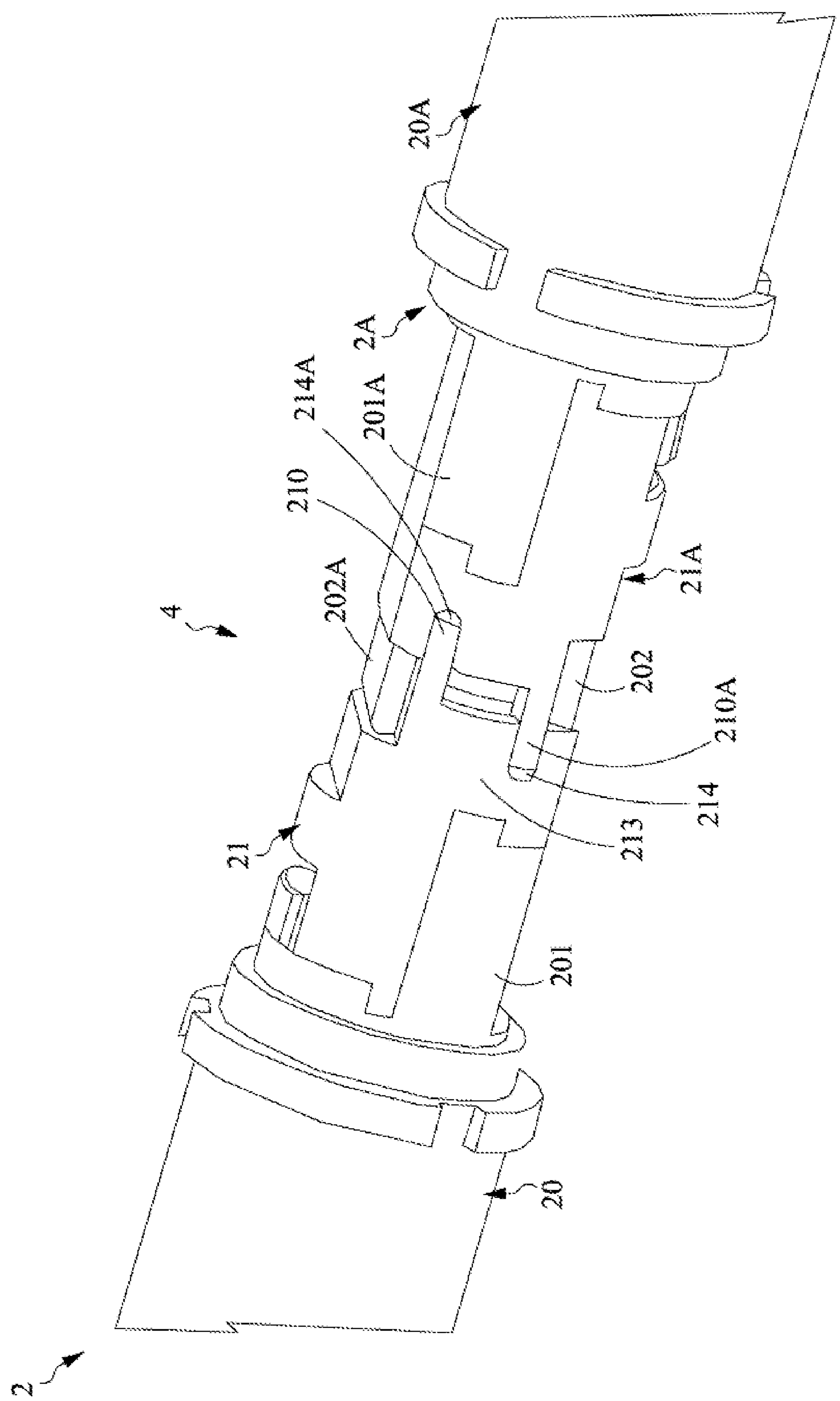
FIG. 5D is a schematic diagram of the combination of two optical connectors in the optical connector module in the present invention.

Please refer to FIGS. 5A to 5D, FIGS. 5A and 5B are partial exploded and three-dimensional schematic diagram of an embodiment of the optical connector module in the present invention, FIG. 5C is a schematic cross-sectional diagram of an embodiment of the second optical connector in the present invention, and FIG. 5D is a schematic diagram of the combination of two optical connectors in the optical connector module in the present invention. In this embodiment, the optical connector module 4 includes a first optical connector 2, a second optical connector 2A, and an airtight kit 2B. The first optical connector 2 is the same structure as shown in FIGS. 2A and 2B, and would not be repeated here. The structure of the second optical connector 2A may be the same as the first optical connector 2 or a different structure. In this embodiment, the same structure is used for description. The second optical connector 2A is coupled to the first optical connector 2, and the second optical connector 2A has a second coupling module 30A, a second protection housing 20A, and a fourth cover 21A. The second protection housing 20A has a second opening (not shown, but is identical to the first opening 200 of the first optical connector 2), and the second protection housing 20A has a third cover 201A on one side of the second opening, a third plate 202A protrudes from one end of the third cover 201A. The fourth cover 21A is detachably coupled to the second protection housing 20A, and an accommodation space 203A is formed between the fourth cover 21A and the third cover 201A for accommodating the second coupling module 30A.

In this embodiment, as shown in FIG. 5C, the second protection housing 20A has a sixth buckle structure 204A, and the fourth cover 21A has a seventh buckle structure 211A formed on the second pressing plate 212A of the fourth cover 21A, the seventh buckle structure 211A is engaged with the sixth buckle structure 204A. As shown in FIGS. 5A and 5B, there is a clamping plate 213A on both sides of the second cover 21A, and a second positioning structure 214A is disposed on the clamping plate 213A. The fourth plate 210A protrudes from one end of the fourth cover 21A. As shown in FIGS. 5B and 5D, when the second optical connector 2A is coupled to the first optical connector 2, the first coupling module 30 and the second coupling module 30A are coupled to each other, the second plate 210 is combined with the fourth cover 21A, the fourth plate 210A is combined with the second cover 21, the first plate 202 is leaned against one side of the fourth plate 210A, and the third plate 202A is leaned against one side of the second plate 210. In this embodiment, when the second optical connector 2A is coupled to the first optical connector 2, the fourth plate 210A is embedded in the first positioning structure 214, and the second plate 210 is embedded in the second positioning structure 214A. After the first optical connector 2 and the second optical connector 2A are connected to each other, the airtight kit 2B is airtightly sleeved on the first cover 201, the second cover 21, the third cover 201A, and the fourth cover 21A, and is used for protecting the first cover 201, the second cover 21, the third cover 201A and the fourth cover 21A from the external impact or destruction, such as temperature and humidity.

Figure 6:
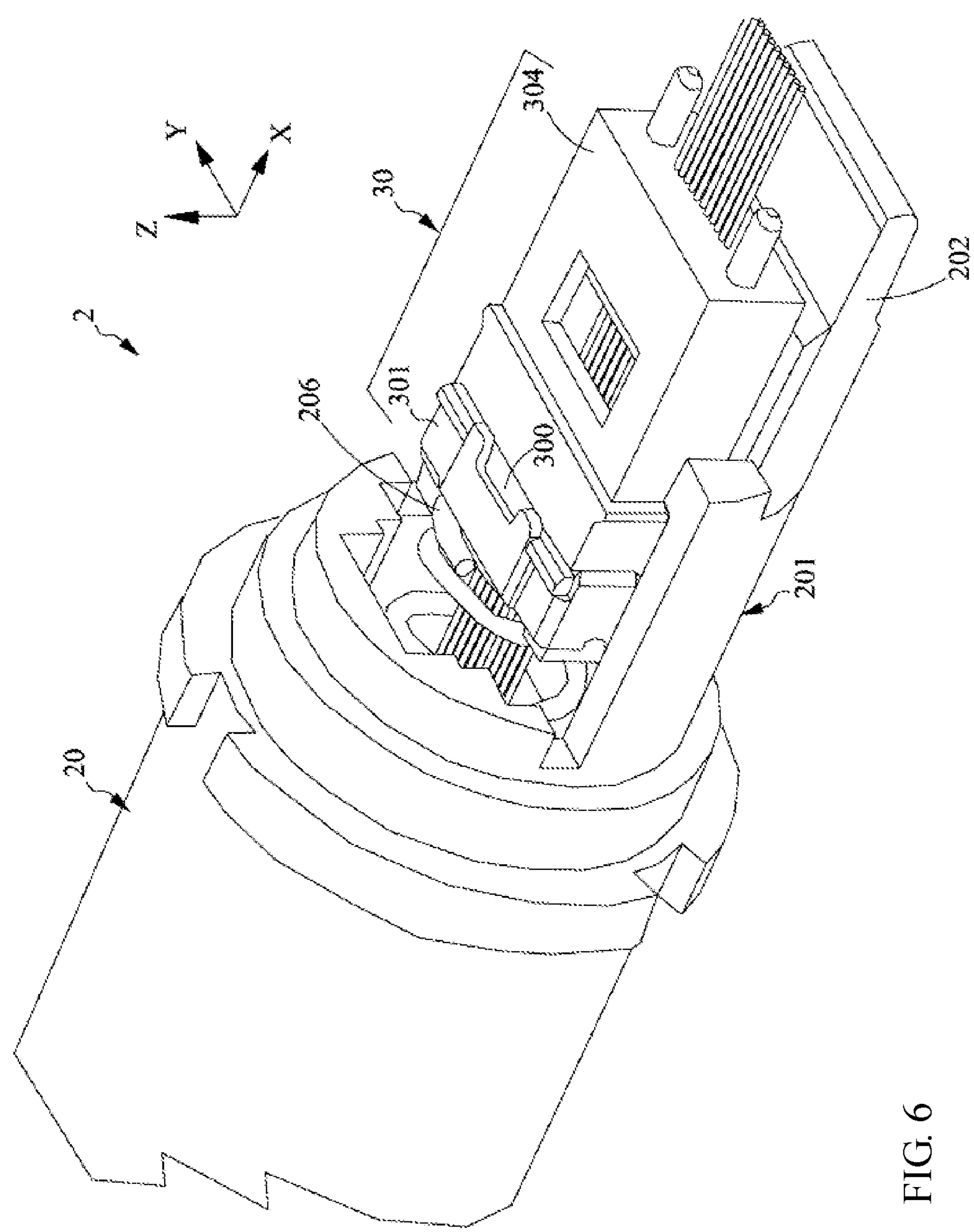
FIG. 6 is a schematic diagram of disassembling the second cover of the optical connector in the present invention.

The optical connector of the present invention is used to protect the first coupling module located in the protection fork from contamination and prevent mis-insertion through the protection fork formed by the first plate 202 and the second plate 210. In addition, in one embodiment, the second cover 21 is removed to disassemble the protection fork, as shown in FIG. 6, at this time, the first coupling module 30 including the optical fiber head may move along the axis of the optical connector (in this embodiment, the X direction), so that the main structure at one end of the entire optical connector, that is, the first coupling structure 30 may be pulled out to facilitate its maintenance and cleaning. After the maintenance, the optical fiber head is pulled back into the first protection housing 20, and the second cover 21 is installed. This process increases the convenience of maintenance. Also, because of this design, the first coupling structure 30 may be installed finally, and is not necessary to install in advance.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector, comprising:

a first coupling module;

a first protection housing, having a first opening, the first protection housing having a first cover on a side of the first opening, and a first plate protruding from an end of the first cover; and a second cover, detachably coupled to the first protection housing, an accommodation space formed between the first cover and the second cover for accommodating the first coupling module, and a second plate protruding from an end of the second cover, wherein the first coupling module is disposed on the first protection housing.

2. The optical connector of claim 1, wherein the first coupling module comprises a guide pin fixing structure, which comprises:

a fixing base, having a through groove, a through hole disposed on a surface of a first slot of the through groove and located on both sides of the first slot for accommodating a guide pin, and a first buckle structure is formed on both sides of the fixing base; and a positioning member, disposed on the fixing base, the positioning member has a pair of parallel lateral plates, which are respectively slidably connected to both sides of the fixing base, the each lateral plate having a second buckle structure, and a positioning plate extended from the each lateral plate and leaned against the surface, and the each positioning plate having a leaning structure, wherein when the positioning member is located at a first location, the second buckle structure is engaged with the first buckle structure, and the leaning structure is used to restrain the guide pin; when the positioning member is located at a second location, the second buckle structure is separated from the first buckle structure, and the leaning structure is separated from the guide pin.

3. The optical connector of claim 2, wherein the positioning member has a third buckle structure, when the third buckle structure is located at the second location, the third buckle structure is engaged with the first buckle structure.

4. The optical connector of claim 2, wherein a second slot located at another end of the through groove of the fixing base has a plurality of guide blocks, which are connected to an elastic element arranged in the first protection housing, and the plurality of guide blocks are used to adjust an angle of the first coupling module in different axial directions.

5. The optical connector of claim 3, wherein the first protection housing has a fourth buckle structure, the second cover has a fifth buckle structure formed on a first pressing plate of the second cover, the fifth buckle structure is engaged with the fourth buckle structure, two sides of the second cover have a clamping plate, and a first positioning structure is disposed on the clamping plate.

6. The optical connector of claim 2, wherein the first coupling module comprises:

a clamping seat, a first end of the clamping seat coupled to the fixing base, the clamping seat having a wire groove to allow a communication wire to pass through; and a coupling head, coupled to a second end of the clamping seat, the coupling head having a wiring space to allow the communication wire to pass through, an observation window connected to the wiring space, a plurality of wire channels configured for allowing the communication wire having a plurality of sub-wires to pass through, and a pair of through holes configured for allowing the guide pins to pass through respectively.

7. An optical connector module, comprising:

a first optical connector, including a first coupling module, a first protection housing, and a second cover, the first protection housing having a first opening, and the first protection housing having a first cover on a side of the first opening, a first plate protruding from an end of the first cover, the second cover detachably coupled to the first protection housing, a first accommodation space is formed between the second cover and the first cover for accommodating the first coupling module, and a second plate protruding from an end of the second cover; and a second optical connector, coupled to the first optical connector, the second optical connector having a second coupling module, a second protection housing, and a fourth cover, the second protection housing having a second opening, the second protection housing having a third cover on a side of the second opening, and a third plate protruding from an end of the third cover, the fourth cover detachably coupled to the second protection housing, a second accommodation space formed between the fourth cover and the third cover for accommodating the second coupling module, and a fourth plate protruding from an end of the fourth cover, wherein when the second optical connector is coupled to the first optical connector, the first coupling module is coupled to the second coupling module, the second plate is combined with the fourth cover, the fourth plate is combined with the second cover, the first plate is leaned against a side of the fourth plate, and the third plate is leaned against a side of the second plate, wherein the first coupling module is disposed on the first protection housing, and the second coupling module is disposed on the second protection housing.

8. The optical connector module of claim 7, wherein the first coupling module or the second coupling module comprises a guide pin fixing structure, which comprises:

a fixing base, having a through groove, a through hole disposed on a surface of a first slot of the through groove and located on both sides of the first slot for accommodating a guide pin, and a first buckle structure is formed on both sides of the fixing base; and a positioning member, disposed on the fixing base, the positioning member has a pair of parallel lateral plates, which are respectively slidably connected to both sides of the fixing base, the each lateral plate having a second buckle structure, and a positioning plate extended from the each lateral plate and leaned against the surface, and the each positioning plate having a leaning structure, wherein when the positioning member is located at a first location, the second buckle structure is engaged with the first buckle structure, and the leaning structure is used to restrain the guide pin; when the positioning member is located at a second location, the second buckle structure is separated from the first buckle structure, and the leaning structure is separated from the guide pin.

9. The optical connector module of claim 8, wherein the positioning member has a third buckle structure, when the third buckle structure is located at the second location, the third buckle structure is engaged with the first buckle structure.

10. The optical connector module of claim 8, wherein a second slot located at another end of the through groove of the fixing base has a plurality of guide blocks, which are connected to an elastic element arranged in the first protection housing, and the plurality of guide blocks are used to adjust an angle of the first coupling module in different axial directions.

11. The optical connector module of claim 8, wherein the first coupling module comprises:

a clamping seat, a first end of the clamping seat coupled to the fixing base, the clamping seat having a wire groove to allow a communication wire to pass through; and a coupling head, coupled to a second end of the clamping seat, the coupling head having a wiring space to allow the communication wire to pass through, an observation window connected to the wiring space, a plurality of wire channels configured for allowing the communication wire having a plurality of sub-wires to pass through, and a pair of through holes configured for allowing the guide pins to pass through respectively.

12. The optical connector module of claim 9, wherein the first protection housing has a fourth buckle structure, the second cover has a fifth buckle structure formed on a first pressing plate of the second cover, the fifth buckle structure is engaged with the fourth buckle structure, two sides of the second cover have a clamping plate, and a first positioning structure is disposed on the clamping plate.

13. The optical connector module of claim 12, wherein the fourth plate is embedded into the first positioning structure.

14. The optical connector module of claim 12, wherein the first pressing plate is deformed by a pressure, so that the fourth buckle structure is separated from the fifth buckle structure.

15. The optical connector module of claim 12, wherein the second protection housing has a sixth buckle structure, the fourth cover has a seventh buckle structure formed on a second pressing plate of the fourth cover, the seventh buckle structure is engaged with the sixth buckle structure, two sides of the second cover have a clamping plate, and a second positioning structure is disposed on the clamping plate.

16. The optical connector module of claim 15, wherein the second plate is embedded in the second positioning structure.

17. The optical connector module of claim 15, wherein the second pressing plate is deformed by a pressure, so that the sixth buckle structure is separated with the seventh buckle structure.

* * * * *